United States Patent
Morin et al.

(10) Patent No.: US 11,736,415 B2
(45) Date of Patent: Aug. 22, 2023

(54) BACKPRESSURE FROM AN EXTERNAL PROCESSING SYSTEM TRANSPARENTLY CONNECTED TO A ROUTER

(71) Applicant: Nokia Solutions and Networks Oy, Espoo (FI)

(72) Inventors: Steve Morin, Ottawa (CN); John Fischer, Ottawa (CN); Peter Tregunno, Ottawa (CN)

(73) Assignee: Nokia Solutions and Networks Oy, Espoo (FI)

( * ) Notice: Subject to any disclaimer, the term of this patent is extended or adjusted under 35 U.S.C. 154(b) by 140 days.

(21) Appl. No.: 16/786,164

(22) Filed: Feb. 10, 2020

(65) Prior Publication Data

US 2021/0250308 A1    Aug. 12, 2021

(51) Int. Cl.
  *G01R 31/08*      (2020.01)
  *H04J 1/16*       (2006.01)
  (Continued)

(52) U.S. Cl.
  CPC ........ *H04L 49/506* (2013.01); *G06F 9/45558* (2013.01); *H04L 45/74* (2013.01);
  (Continued)

(58) Field of Classification Search
  CPC ....... H04L 49/506; H04L 45/74; H04L 47/24; H04L 47/263; H04L 49/3045;
  (Continued)

(56) References Cited

U.S. PATENT DOCUMENTS 7,046,665 B1 * 5/2006 Walrand ................. H04L 47/10
                                                        370/392
9,329,886 B2   5/2016 Vincent
                (Continued)

FOREIGN PATENT DOCUMENTS

| EP | 3122005 A1 * | 1/2017 | ............. H04L 43/12 |
| WO | WO 2018/0232958 A1 | 12/2018 | |
| WO | WO-2020202169 A1 * | 10/2020 | ......... G06F 9/45558 |

OTHER PUBLICATIONS

Guo et al. (RDMA over Commodity Ethernet at Scale, Aug. 22-26, 2016) (Year: 2016).*

(Continued)

*Primary Examiner* — Maharishi V Khirodhar
(74) *Attorney, Agent, or Firm* — Tong, Rea, Bentley & Kim, LLC

(57) ABSTRACT

An external processing system includes a port configured to exchange signals with a router and one or more processors configured to instantiate an operating system and a hypervisor based on information provided by the router in response to the external processing system being connected to the router. The processors implement a user plane layer that generates feedback representative of a processing load and provides the feedback to the router via the port. The router includes a port allocated to an external processing system and a controller that provides the information representing the operating system and hypervisor in response to connection of the external processing system. The controller also receives feedback indicating a processing load at the external processing system. A queue holds packets prior to providing the packets to the external processing system. The controller discards one or more of the packets from the queue based on the feedback.

23 Claims, 6 Drawing Sheets

(51) Int. Cl.
*H04L 49/506* (2022.01)
*G06F 9/455* (2018.01)
*H04L 45/74* (2022.01)
*H04L 47/24* (2022.01)
*H04L 47/263* (2022.01)
*H04L 49/00* (2022.01)

(52) U.S. Cl.
CPC ............ *H04L 47/24* (2013.01); *H04L 47/263* (2013.01); *H04L 49/3045* (2013.01); *G06F 2009/45595* (2013.01)

(58) Field of Classification Search
CPC ... H04L 12/56; H04L 49/555; H04L 41/0806; G06F 9/45558; G06F 2009/45595; G06F 9/45533; G06F 8/61
USPC ........................................................ 370/235
See application file for complete search history.

(56) References Cited

U.S. PATENT DOCUMENTS

| | | | |
|---|---|---|---|
| 2009/0228629 A1 | 9/2009 | Gebhart et al. | |
| 2013/0318255 A1* | 11/2013 | Karino ................... | H04L 45/00 709/238 |
| 2013/0322236 A1* | 12/2013 | Bahadur ................. | H04L 45/04 370/230 |
| 2015/0026681 A1* | 1/2015 | Lin ..................... | G06F 9/45533 718/1 |
| 2015/0089331 A1* | 3/2015 | Skerry ................ | G06F 9/45533 714/799 |
| 2017/0339060 A1* | 11/2017 | Memon ............... | H04L 47/2433 |
| 2018/0367457 A1* | 12/2018 | Minakuchi ............. | H04L 47/11 |
| 2019/0097931 A1* | 3/2019 | Atli ......................... | H04L 47/12 |
| 2021/0144059 A1* | 5/2021 | Sundarababu ...... | H04L 12/4641 |

OTHER PUBLICATIONS

Yamamoto (Integration of existing Ethernet devices into time division Multiplexing Ethernet, 2017) right column of p. 1172, (Year: 2017).*

U.S. Appl. No. 16/786,152, filed Feb. 10, 2020, listing Steve Morin et al. as inventors, entitled "Automatic Configuration of an Extended Service Appliance for Network Routers".

European Office Action mailed in corresponding EP 21154156.0 dated Jun. 7, 2021, 16 pages.

Djohn, "Create a Virtual Machine on a Remote Server," Jan. 1, 2019, XP055807035, retrieved from URLhttps://docs.vmware.com/en/VMare-Fusion/12/com.vmware.fusion.using.doc/GUID-67E30EC7-74F2-4F75-B5AE-C3BC4711A2DD.html on May 25, 2021, 3 pages.

Kakadia, D., "Tech Concepts: Enterprise Q0S Policy Based Systems & Network Management," Dec. 31, 2001, XP055807352, retrieved from URL:http://citeseerx.ist.psu.edu/viewdoc/download?doi=10.1.1.202.143&rep=rep1&type-pdf on May 25, 2021, 49 pages.

Allied Telesis, "Unified Threat Management (UTM) Offload—Feature Overview and Configuration Guide Technical Guide," Jul. 2, 2018, XP055921732, retrieved from https://www.alliedtelesis.com/sites/default/files/utm_offload_feature_overview_guide.pdf on May 16, 2022, 17 pages.

Allied Telesis, "Unified Threat Management (UTM) Offload—Feature Overview and Configuration Guide Technical Guide," Jul. 2, 2018, XP055921722, retrieved from https://www.alliedtelesis.com/sites/default/files/documents/configuration-guides/utm_offload_feature_overview_guide.pdf on May 16, 2022, 16 pages.

EP Examination Report mailed in corresponding EP Application No. 21154156.0 dated May 23, 2022, 9 pages.

* cited by examiner

BACKPRESSURE FROM AN EXTERNAL PROCESSING SYSTEM TRANSPARENTLY CONNECTED TO A ROUTER

BACKGROUND

Routers are one of the fundamental building blocks of networks. They are used to forward data packets from a source to a destination via the network that includes the router. In response to receiving a packet, the router reads a header of the packet to identify a destination of the packet, e.g., using a destination address included in the header. The router then forwards the packet to a next hop along the path to the destination using information stored in a routing table or a routing policy implemented by the router. High-performance routers are optimized to support capacities of hundreds of terabits per second in some cases and subsequent generations of routers are expected to achieve even higher routing capacities. In order to achieve these routing capacities, routers are typically constrained to perform a small set of operations that are directly related to routing. For example, the processors in the routers are optimized to examine the header of an incoming packet for a tuple that includes a source address, a destination address, and corresponding ports. The tuple is then used to forward the incoming packet to its next hop. Other content included in the packet, such as the packet payload, is ignored and the forwarding process is stateless, i.e., forwarding decisions are based only on information included in the incoming packet header and are not affected by any previous events or other packets.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
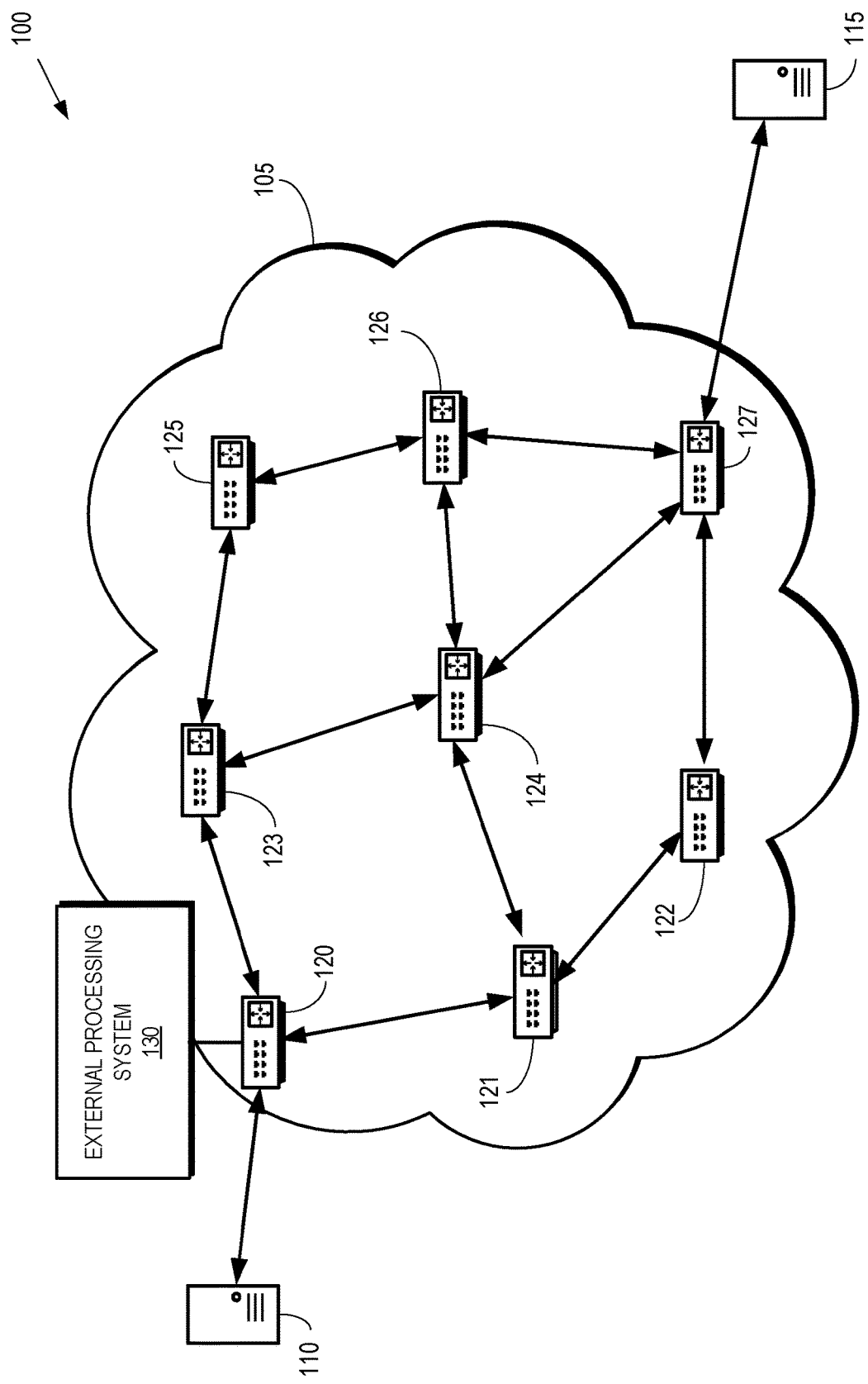
FIG. 1 is a block diagram of a communication system that supports the automatic configuration of an extended service appliance according to some embodiments.

Routers that are optimized for forwarding have a limited ability to perform other operations related to packet transmission through the network. Stateful processing, which tracks and uses information from previously received incoming packets, is not implemented in conventional stateless routers. Conventional routers also have limited general-purpose computing resources to perform operations including packet inspection or manipulation of the payloads of incoming packets. Conventional routers therefore have limited or no ability perform operations such as network address translation, deep packet inspection, stateful firewalls, secure encryption/decryption according to protocols such as IPSec, video transcoding, video and content buffering, and the like. Additional general-purpose computing resources are sometimes incorporated into the router, e.g., by adding general-purpose processor cores to a router control card that provides centralized compute resources for input/output (I/O) functions or distributed compute resources for I/O functions that are distributed over multiple user plane forwarding line cards (also referred to herein as "blades") in the router system. However, these approaches require that the routing functionality in the general-purpose functionality share computing resources including board space, central processing units (CPUs), memory, thermal dissipation hardware, and the like, which reduces availability of these resources for the routing functionality.

General-purpose computing resources can also be provided to complement the routing function by using specialized hardware. For example, the router system can include additional blades dedicated to packet processing that are inserted into existing router I/O slots within the system chassis. Although dedicating a general-purpose processing blade to a router I/O slot increases the processing scale and capacity, the general-purpose processing blade consumes a scarce I/O slot and therefore reduces the overall system I/O capacity. The characteristics of the slot also constrain the amount of board space, power distribution, and other resources available to the general-purpose processing blade. For another example, the router systems (or the general-purpose compute functions) can be implemented using network function virtualization (NFV) to perform the routing and general-purpose compute functions on a general-purpose computer server. Implementing a router system using NFV trades off scale, performance and cost to maximize flexibility relative to a dedicated router system. In practice, NFV-based router systems introduce costs and complexities that may not be competitive with dedicated hardware routers when implementing large-scale user plane functionality. Simply offloading the general-purpose computing to an NFV system requires steering traffic from the dedicated router system to the NFV functions, which requires additional (as well as complex and costly) user plane or management plane mechanisms to transfer and synchronize states between the dedicated router and the NFV functions.

FIGS. 1-5 disclose embodiments of an external processing system that is rendered transparent to a dedicated router, so that the dedicated router sees the external processing system as a local entity, using feedback from the external processing system. In some embodiments, control channels for the functionality implemented on the VMs in the external processing system are mapped to physical interfaces to support an emulated local interface between the dedicated router in the external processing system. The control channels convey commands to access or control state associated with the VMs, as well as supporting configuration and health checks for the VMs. In the user plane, the dedicated router provides flow control to maintain quality of service (QoS) for packets transmitted using user plane interfaces between the dedicated router and the external processing system. The flow control is performed based on feedback received from the external processing system via a user plane layer (referred to herein as a "shim" layer) that generates feedback (sometimes referred to herein as "backpressure") representative of a processing load within the processing system. In some embodiments, the shim layer provides the feedback by transmitting an ethernet pause frame in response to the processing load exceeding a set of thresholds. In response to receiving the feedback, the dedicated router holds subsequent packets in a set of QoS queues that are used for QoS control. A controller in the dedicated router selectively discards one or more packets from one or more of the QoS queues in the set of QoS queues, thereby leveraging the optimized QoS control functionality of the dedicated router to avoid uncontrolled packet loss at the external processing system.

FIG. 1 is a block diagram of the communication system 100 that supports the automatic configuration of an extended service appliance according to some embodiments. The communication system 100 includes a network 105 that provides communication pathways between a server 110 and a server 115. However, some embodiments of the network 105 provide communication pathways between other entities or users including desktop computers, laptop computers, tablet computers, smart phones, Internet of Things (IoT) devices, and the like. The communication system 100 includes a set of routers 120, 121, 122, 123, 124, 125, 126, 127, which are collectively referred to herein as "the routers 120-127."

Some embodiments of the routers 120-127 implement stateless forwarding to forward packets based on information included in the packets. In response to receiving a packet, the routers 120-127 read a header of the packet to identify a destination of the packet, e.g., using a destination address included in the header. The routers 120-127 forward the packet to a next hop along the path to the destination using information stored in a routing table or a routing policy implemented by the router. For example, the router 120 includes a routing table that is used to determine the next hop for a packet received with the source address of the server 110 and the destination address of the server 115. If the routing table indicates that the router 121 is the next hop, the router 120 forwards the packet to the router 121.

As discussed herein, the stateless routers 120-127 are optimized for forwarding and therefore have a limited ability to perform other operations related to packet transmission through the network. External processing systems (also referred to herein as extended service appliances) 130 are therefore provided to enhance the capabilities of the stateless routers 120-127. In the interest of clarity, a single external processing system 130 is shown connected to the router 120 in FIG. 1. However, other external processing systems are connected to the other routers 121-127 in some embodiments. The external processing system 130 is connected to the router 120 via an interconnection port (not shown in FIG. 1) in the router 120. The interconnection port is one of a plurality of interconnection ports that are used to connect entities including the server 110, the router 121, and the router 123 to the router 120. The router 120 is therefore able to route packets received from one of the connected entities (i.e., the server 110, the router 121, the router 123, and the external processing system 130) to another one of the connected entities (i.e., the server 110, the router 121, the router 123, and the external processing system 130).

The external processing system 130 is powered up and connected to the router 120. Prior to installation, the external processing system 130 does not implement an operating system or a hypervisor, e.g., the external processing system 130 is referred to as a "bare metal" system. In response to connecting the external processing system 130, the router 120 generates information representing an operating system and a hypervisor and provides this information to the external processing system 130. The external processing system 130 instantiates the operating system and the hypervisor based on the received information and then the external processing system 130 boots up using the instantiated operating system. At this point, the external processing system 130 is available to instantiate virtual machines (VMs) that perform general-purpose computing on behalf of the router 120.

In operation, the router 120 generates commands that instruct the external processing system 130 to instantiate one or more VMs to perform general-purpose computing. Some embodiments of the commands include information indicating a type of the VM and a request for resources to be allocated to the VM by the external processing system 130. Using the installed operating system and hypervisor, the router 120 instantiates the requested VM based on the requested type and resource allocation. Examples of general-purpose functions that are performed by the VMs instantiated on the external processing system 130 include, but are not limited to, network address translation, secure encryption/decryption, video transcoding, buffering, and filtering on packets received from the router 120. Some embodiments of the router 120 request resource allocations to the VMs based on requirements of the corresponding general-purpose functions. The external processing system 130 returns results of the general-purpose functions performed by the VMs to the router 120 via the interconnection port.

The external processing system 130 provides feedback (or backpressure) to the router 120. Some embodiments of the router 120 support control channels that convey commands to modify a state for virtual machines implemented by the external processing system 130, as well as supporting configuration and health checks for the virtual machines. The control channels are mapped to an interconnection port in the physical interface to support an emulated local interface between the dedicated router in the external processing system. The router 120 provides flow control in the user plane to maintain QoS for packets transmitted using user plane interfaces between the router 120 and the external processing system 130. The flow control is performed based on the feedback received from the external processing system. A controller in the router 120 leverages the optimized QoS control functionality of the router 120 to avoid uncontrolled packet loss at the external processing system 130.

Figure 2:
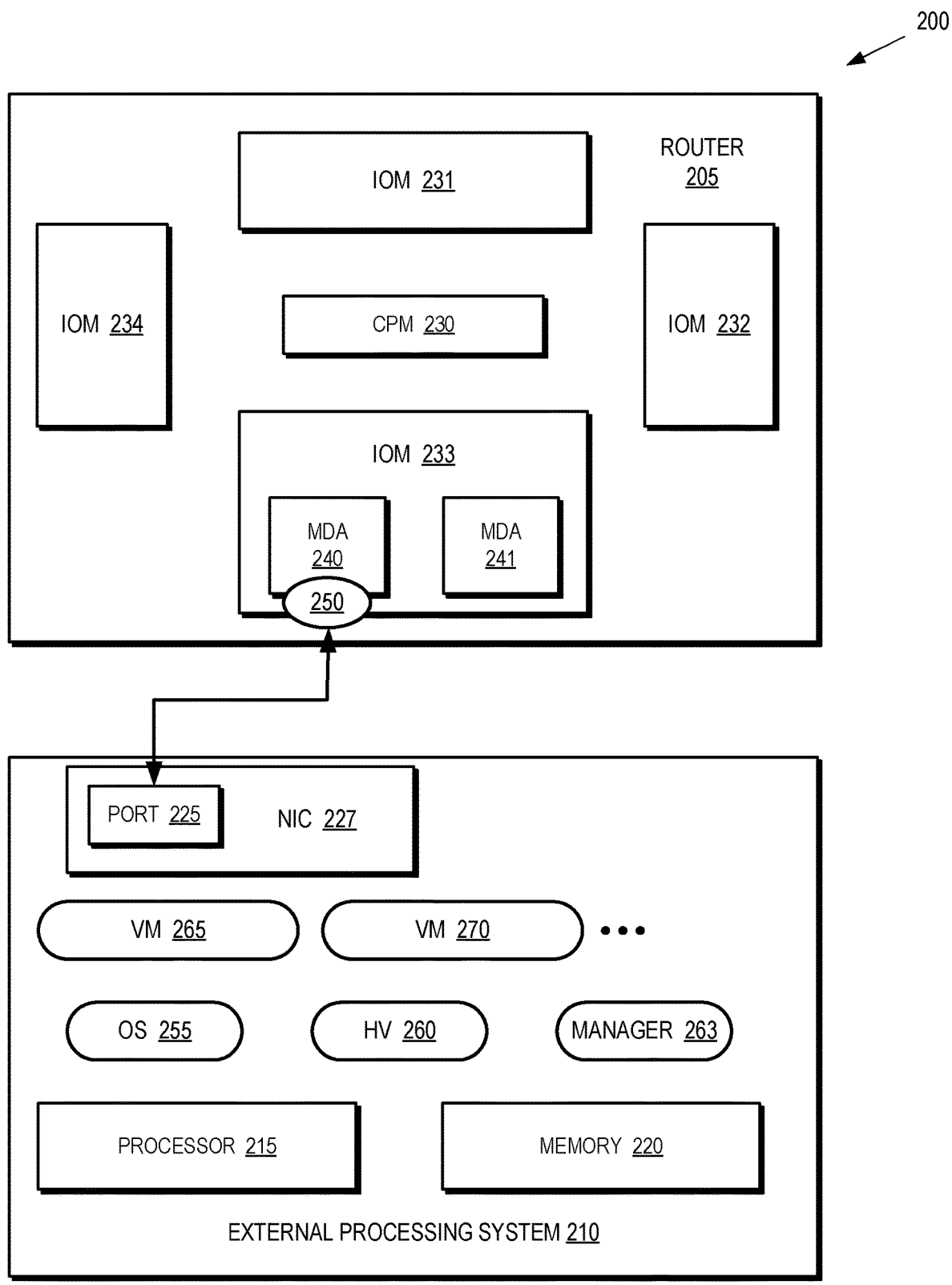
FIG. 2 is a block diagram of a communication system that includes a router and an external processing system according to some embodiments.

FIG. 2 is a block diagram of a communication system 200 that includes a router 205 and an external processing system 210 according to some embodiments. The external processing system 210 includes a processor 215 and a memory 220. The processor 215 executes instructions stored in the memory 220 and stores information in the memory 220 such as the results of the executed instructions. Some embodiments of the processor 215 include multiple cores or compute units to independently or concurrently execute instructions. The external processing system 210 also includes one or more ports 225, although only one port 225 is shown in FIG. 2 in the interest of clarity. The port 225 is implemented as an electrical port, an optical port, or other type of port. Some embodiments of the port 225 are implemented using a network interface card (NIC) 227. When connected to the router 205, the port 225 supports the exchange of information with the router 205.

Some embodiments of the router 205 include a controller such as a control processing module (CPM) 230 and a set of input/output (I/O) modules (IOMs) 231, 232, 233, 234, which are collectively referred to herein as "the I/O modules 231-234." The CPM 230 and the I/O modules 231-234 are implemented as hard-coded or programmable logic, one or more processors executing software/firmware instructions, or any combination thereof. Although four I/O modules 231-234 are shown in FIG. 2, some embodiments of the router 205 include more or fewer I/O modules. The CPM 230 or the IOM 231-234 performs operations including extracting address information from packet headers, performing table lookups based on the extracted address information, and routing the packets based on next hop information retrieved by the table lookups. For example, if the I/O module 231 receives a packet from another router, the I/O module 231 inspects a header of the packet to determine a destination address for the packet and uses a table lookup to determine a next hop for the packet. Based on the next hop information, the CPM 230 or one of the I/O modules 231-234 routes the packet, e.g., by forwarding the packet to another I/O module 231-234, which forwards the packet to the next hop destination.

The I/O modules 231-234 support input and output operations for packets that are received and transmitted by the router 205. The I/O modules 231-234 include one or more media dependent adapters (MDAs) 240, 241 that support one or more ports for connections to entities including servers, other routers, and the external processing system 210. In the illustrated embodiment, some resources of the I/O module 233 (including the MDAs 240, 241) are allocated to the external processing system 210. Other resources of the I/O module 233 are allocated to other external systems or routers (not shown in FIG. 2 in the interest of clarity). The CPM 230 therefore monitors connections to the I/O module 233 to detect attachment or connection of the external processing module 210 to the router 205.

Initially, the external processing system 210 is in a "bare metal" state and does not have an operating system or hypervisor installed. In response to connecting the external processing system 210 to the router 205 via the port 225 and a corresponding port 250 in the MDA 241, the CPM 230 generates information representative of an operating system and a hypervisor. The CPM 230 then provides the information to the external processing system 210 via the MDA 241 in the IOM 233. In some embodiments, the processor 215 performs a dynamic discovery process to discover a management Internet protocol (IP) address of the external processing system 210 in response to the external processing system 210 being connected to the router 205 via the port 225 and the port 250. The processor 215 also receives software configuration information from the router 205 via the port 225 and the port 250. The external processing system 210 uses the provided information to instantiate an operating system 255 and a hypervisor 260. In some embodiments, the hypervisor 260 is a Linux-based hypervisor that supports execution of one or more virtual machines (VMs).

Some embodiments of the hypervisor 260 are implemented using a resilient connection to the CPM 230. For example, a momentary or temporary disconnect of the port connections (e.g., the port 225 or the port 250) between the external processing system 210 and the router 205 does not cause reboot or reconfiguration of the external processing system 210 until the duration of the disconnect exceeds a threshold value.

The external processing system 210 supports one or more thresholds of communication detection between the router 205 and the external processing system 210, and these are independent from the conventional port hold timers typically implemented on the I/O modules 231-234. In some embodiments, a first threshold is used to detect VM failure, e.g., failure of one or more of the VM 265, 270. In response to detecting VM failure based on the first threshold, only the VM associated with a timer that exceeds the first threshold is reset. For example, if the CPM 230 detects a problem with the VM 265, the VM 265 is reset and the VM 270 is unaffected by the reset. The OS 255 and the hypervisor 260 are also unaffected by the reset of the VM 265. A second threshold is used to detect issues with the OS 255 or the hypervisor 260. The external processing system 210 is reset in response to a corresponding timer exceeding the second threshold. In some cases, the CPM 230 resets the whole external processing system 210 without reinstalling new software to implement the operating system 255 or the hypervisor 260. In other cases, the CPM 230 installs new software to implement the operating system 255, the hypervisor 260, or both and then resets the whole external processing system 210 based on the reinstalled operating system 255 or hypervisor 260. The external processing system 210 also resets in response to failure of the port 225 or the port 250 supported by the MDA 241. A manager 263 and the CPM 230 exchange heartbeat messages that are used to determine whether the router 205 and the external processing system 210 are communicating correctly.

The manager 263 running on the OS 255 in the external processing system 210 instantiates virtual machines 265, 270 based on the operating system 255 and the hypervisor 260 in response to commands received from the router 205 via the port 225. In some embodiments, the commands include information indicating types of the virtual machines 265, 270 and resources to be allocated to the virtual machines 265, 270. For example, the types can indicate services that run on virtualized integrated services adapters (v-ISAs) to provide v-ISA functions and the resources can indicate a number of cores of the processor 215, a portion of the memory 220, and the like. The virtual machines 265, 270 are used to implement operations performed on packets received from the router 205. In some embodiments, the operations include network address translation, secure encryption/decryption, video transcoding, buffering, and filtering on packets received from the router 205. The processor 215 stores results of the operations in the allocated memory 220 and returns the results to the router 205 via the port 225 and the IOM 233.

The following configuration fragment is an example of a command set executed on the CPM 230 to configure the virtual machines 265, 270 using information that indicates an AA-type virtual machine and a BB type virtual machine. The configuration fragment also indicates numbers of cores to allocate to the virtual machines 265, 270 (e.g., twelve cores are allocated to the VM type AA and nine cores are allocated to the VM type BB) and an amount of memory to be allocated to the virtual machines 265, 270 (e.g., 20 GB are allocated to the VM type AA and 40 GB are allocated to the VM type BB).

```
configure
    esa 1 create
        description "Esa for AA-BB"
        host-port 1/1/1
        vm 1 create
            description "Application-Assurance ISA"
            vm-type aa
```

```
host-port 1/1/1
cores 12
memory 20 GB
no shutdown
exit
vm 2 create
    description "Broadband ISA"
    vm-type bb
    host-port 1/1/1
    cores 9
    memory 40 GB
    no shutdown
exit
```

Some embodiments of the router 205 support additional ports that are used to connect to additional ports in the external processing system 210 or ports in other external processing systems (not shown in FIG. 2). For example, the MDA 240 can support an additional port that connects to other ports on the external processing system 210, or a port in another external processing system (not shown in FIG. 2), or to another router, e.g., the routers 121 or 123 shown in FIG. 1. The additional ports may be associated with virtual machines that are instantiated by the external processing system 210 or other external processing systems (not shown in FIG. 2), or other routers (not shown in FIG. 2).

Figure 3:
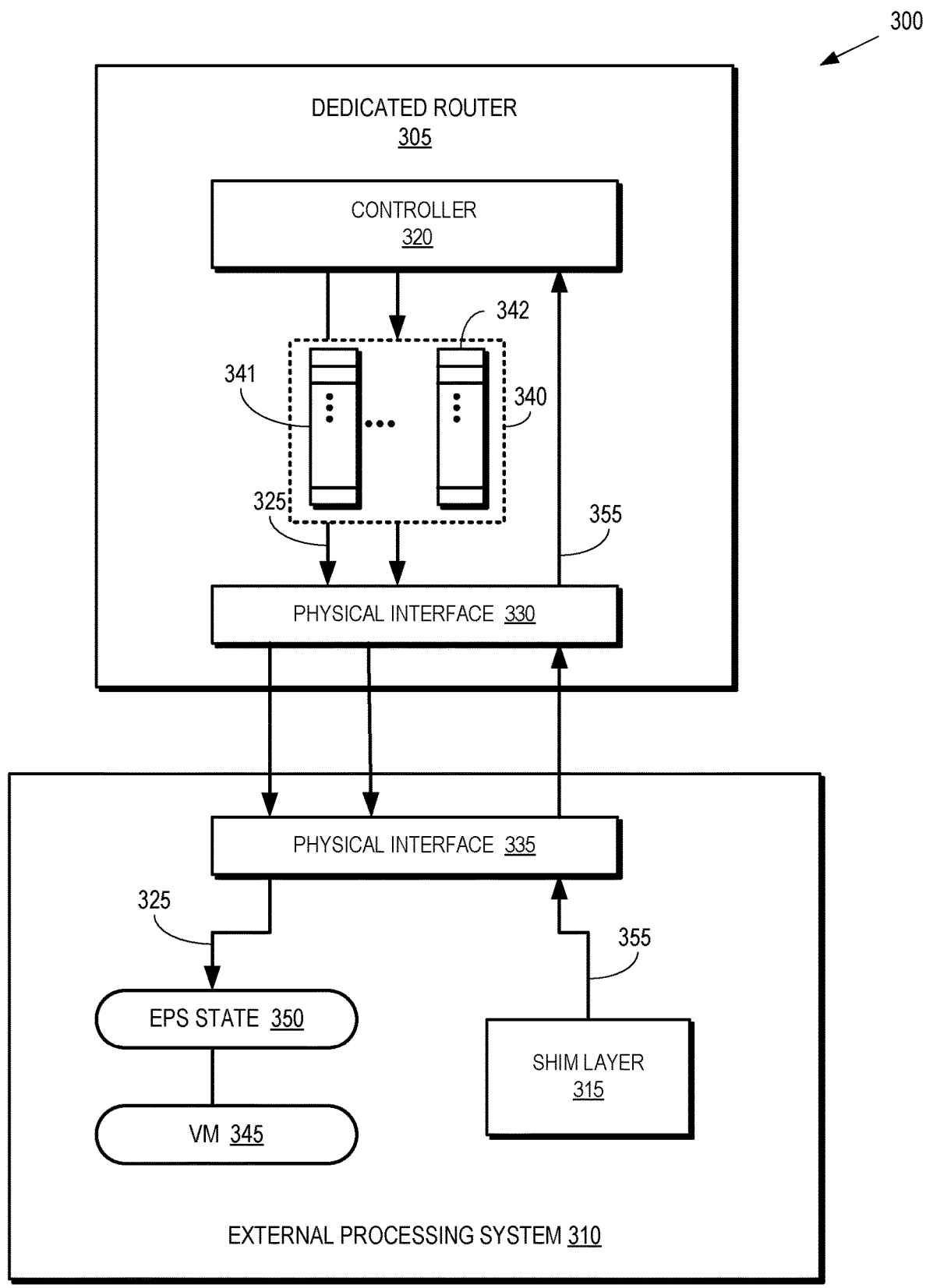
FIG. 3 is a block diagram of a communication system that includes a dedicated router and an external processing system that implements a shim layer to provide backpressure to the router according to some embodiments.

FIG. 3 is a block diagram of a communication system 300 that includes a dedicated router 305 and an external processing system 310 that implements a shim layer 315 to provide backpressure to the router 305 according to some embodiments. The communication system 300 corresponds to some embodiments of the communication system 100 shown in FIG. 1 and the communication system 200 shown in FIG. 2. Although not shown in FIG. 3, the external processing system 310 includes a processor (which may include one or more processor cores or compute units) and a memory such as the processor 215 and the memory 220 shown in FIG. 2. The processor is used to implement some embodiments of the shim layer 315. For example, the shim layer 315 can be implemented as part of the manager 263 shown in FIG. 2.

The dedicated router 305 includes a controller 320 that is implemented as hard-coded or programmable logic, one or more processors executing software/firmware instructions, or any combination thereof. The dedicated router 305 also includes a set 340 of queues 341, 342 that hold packets that are routed to the external processing 310 in the user plane and control channel information, as discussed below. The queues 341, 342 are used to store packets having different characteristics such as different priorities. For example, the queue 341 is used to hold relatively high priority control plane packets and the queue 342 is used to store relatively low priority (or best effort) packets such as user plane packets. Although two queues 341, 342 are shown in the set 340, some embodiments of the dedicated router 305 include additional queues in the set 340 that are associated with additional characteristics such as additional priority levels. If necessary, the controller 320 selectively discourage one or more of the packets held in one or more of the queues 341, 342 prior to transmission of the packets to the external processing system 310. Some embodiments of the controller 320 preferentially discard packets from the lower priority (or best effort) queue 342 so that higher priority control plane packets continue to be transmitted even under conditions of high loading at the external processing system 310.

The controller 305 supports one or more control channels 325 that conveys control signaling to the external processing 310 via a physical interface 330 in the dedicated router 305 and a physical interface 335 in the external processing system 310. As discussed herein, the physical interfaces 330, 335 support corresponding ports such as the ports 225, 250 shown in FIG. 2. In some embodiments, the control channels 325 are mapped to the physical interface 330 via the set 340 of queues 341, 342. For example, the control channels 325 can use the queue 341 with a priority that is set relative to other queues including the queue 342 that is used to hold user plane traffic. The control channels support an emulated local interface between the dedicated router 305 and the external processing system 310. The emulated local interface makes the external processing system 310 transparent to the controller 320, which treats the functionality supported by the external processing system 310 as local functionality.

As discussed herein, the external processing system 310 implements one or more virtual machines 345 that are configured using corresponding state information 350 that includes NIC ingress queue depth information. As discussed herein, the virtual machines 345 receive packets in the user plane from the dedicated router 305 and perform general-purpose operations on the packets before returning the results of the general-purpose operations to the dedicated router 305 via the physical interfaces 330, 335. The shim layer 315 monitors operation of the virtual machine 345 and the state information 350 to determine characteristics of the virtual machine 345 such as a processing load on the virtual machine 345. Some embodiments of the shim layer 315 determine the characteristics by monitoring the NIC ingress queue depth at the physical interface 305 and, in some cases, monitoring other statistics associated with the virtual machine 345 and CPU.

The shim layer 315 then generates feedback 355 based on the monitored characteristics of the virtual machine 345. In some embodiments, the shim layer 315 generates the feedback 355 by transmitting an instruction to the NIC to transmit an ethernet pause frame in response to a processing load on the virtual machine 345 exceeding a threshold. The ethernet pause frame includes information indicating when the dedicated router 305 is to pause transmission of packets and the duration of the pause. If multiple virtual machines are instantiated, the digital feedback 355 is provided in response to their processing loads exceeding corresponding thresholds, which may be different for different virtual machines depending on the resources allocated to the virtual machines. The feedback 355 is provided periodically, in response to an event (such as the processing load exceeding a threshold), or at other time intervals. The feedback 355 can include information indicating the processing load exceeding the threshold, information indicating a difference between the processing load and the threshold, or other information indicating relative values of the processing load and the threshold.

The controller 320 generates commands to access, control, or modify the state information 350 and the control channels 325 convey the commands to the external processing system 310 via the interfaces 330, 335. In some cases, the commands include configuration and health checks for the virtual machine 345. The health checks include heartbeat messages that are transmitted by the dedicated router 305, which expects a response from the external processing system 310. As long as a response is received, the dedicated router 305 determines that the external processing system 310 is available. If no response to the heartbeat message is received within a set of predetermined time intervals, the dedicated router 305 determines that the external processing 310 is unavailable and stops using (or resets or otherwise makes unavailable) the external processing system 310.

The dedicated router 305 provides flow control to maintain QoS for packets transmitted the physical interfaces 330, 335 between the dedicated router 305 and the external processing system 310. The flow control is performed based on the feedback 355 received from the external processing system 310. As discussed herein, packets in the control plane are held in the queue 341 and packets in the user plane are held in the queue 342. In response to receiving the feedback 355, the dedicated router determines whether to selectively discard packets from one or more of the queues 341, 342 for QoS control. For example, if the feedback 355 indicates that the processing load exceeds the threshold, the dedicated router 305 preferentially discards user plane packets from the queue 342 so that control plane packets (such as heartbeat messages) continue to be transmitted to the external processing system 310 via the physical interfaces 330, 335. For another example, if no feedback 355 has been received or if the feedback 355 indicates that the processing load does not exceed the threshold, the dedicated router 305 allows packets in the queue 341, 342 to flow over the physical interfaces 330, 335.

Figure 4:
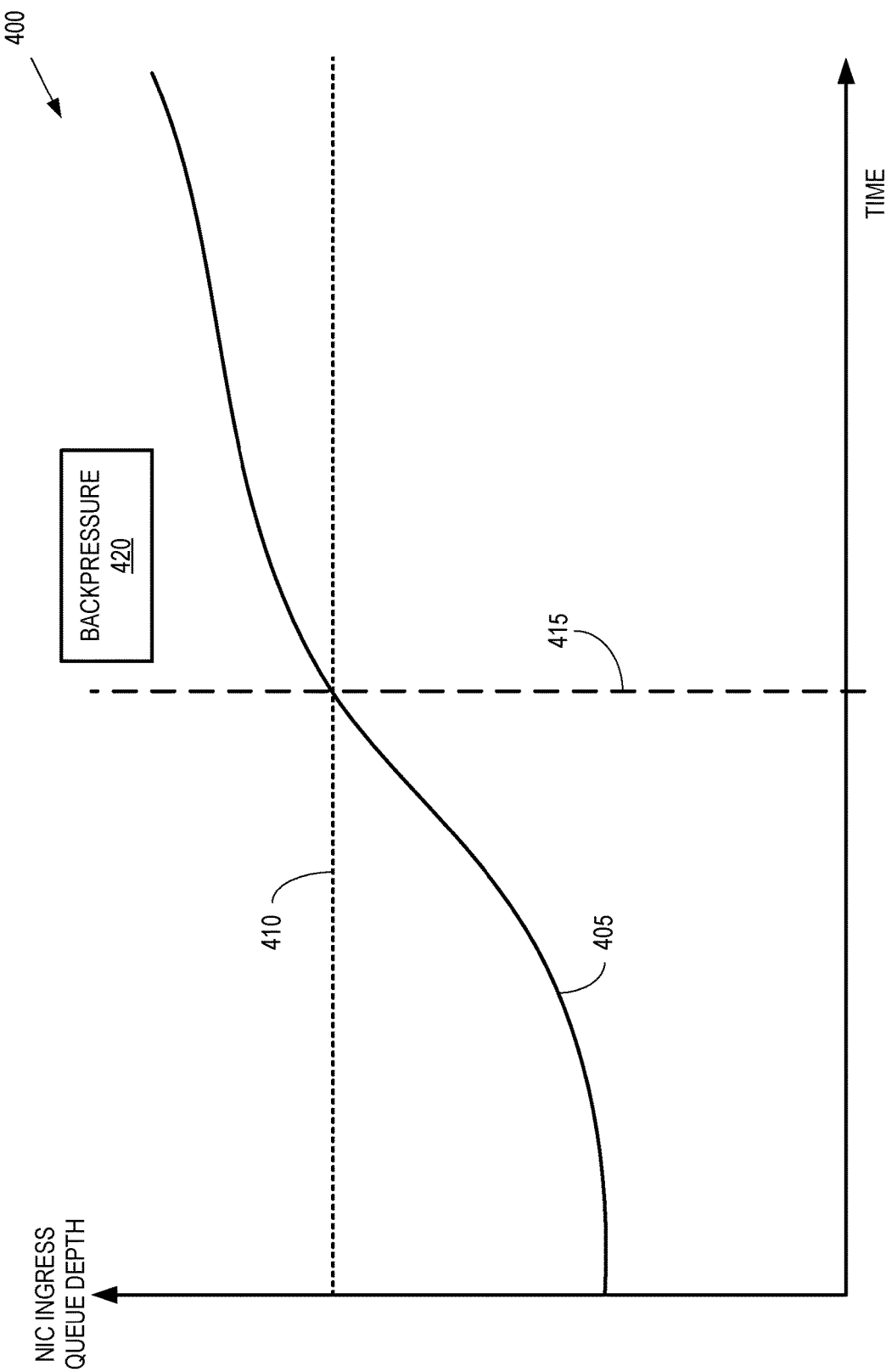
FIG. 4 is a plot of a processing load on a virtual machine implemented in an external processing system while the virtual machine is performing operations for a router according to some embodiments.

FIG. 4 is a plot 400 of an ingress queue depth 405 of a NIC implemented in an external processing system while the virtual machine is performing operations for a router according to some embodiments. The horizontal axis of the plot 400 indicates time increasing from left to right and the vertical axis of the plot 400 indicates a measure of the NIC ingress queue depth. The plot 400 represents the ingress queue depth 405 in some embodiments of the external processing system 130 shown in FIG. 1, the external processing system 210 shown in FIG. 2, and the external processing system 310 shown in FIG. 3. In some embodiments, other characteristics such as a processor load are used to determine when to provide the backpressure feedback.

The plot 400 compares the ingress queue depth 405 to a threshold queue depth 410. At times before the time 415, the ingress queue depth 405 is lower than the threshold depth 410 and the ingress queue depth 405 increases as time passes. The ingress queue depth 405 is equal to the threshold queue depth 410 at the time 415 and increases to become larger than the threshold queue depth 410 at times greater than the time 415. A feedback message 420 including backpressure information is generated by a shim layer in the external processing system in response to the NIC ingress queue depth 405 increasing beyond the threshold queue depth 410. Although a single feedback message 420 is shown in FIG. 4, some embodiments of the shim layer provide additional feedback messages in response to the NIC ingress queue depth 405 remaining larger than the threshold queue depth 410. For example, a substantially continuous stream of feedback messages could be transmitted in response to the NIC ingress queue depth 405 exceeding the threshold queue depth 410.

Figure 5:
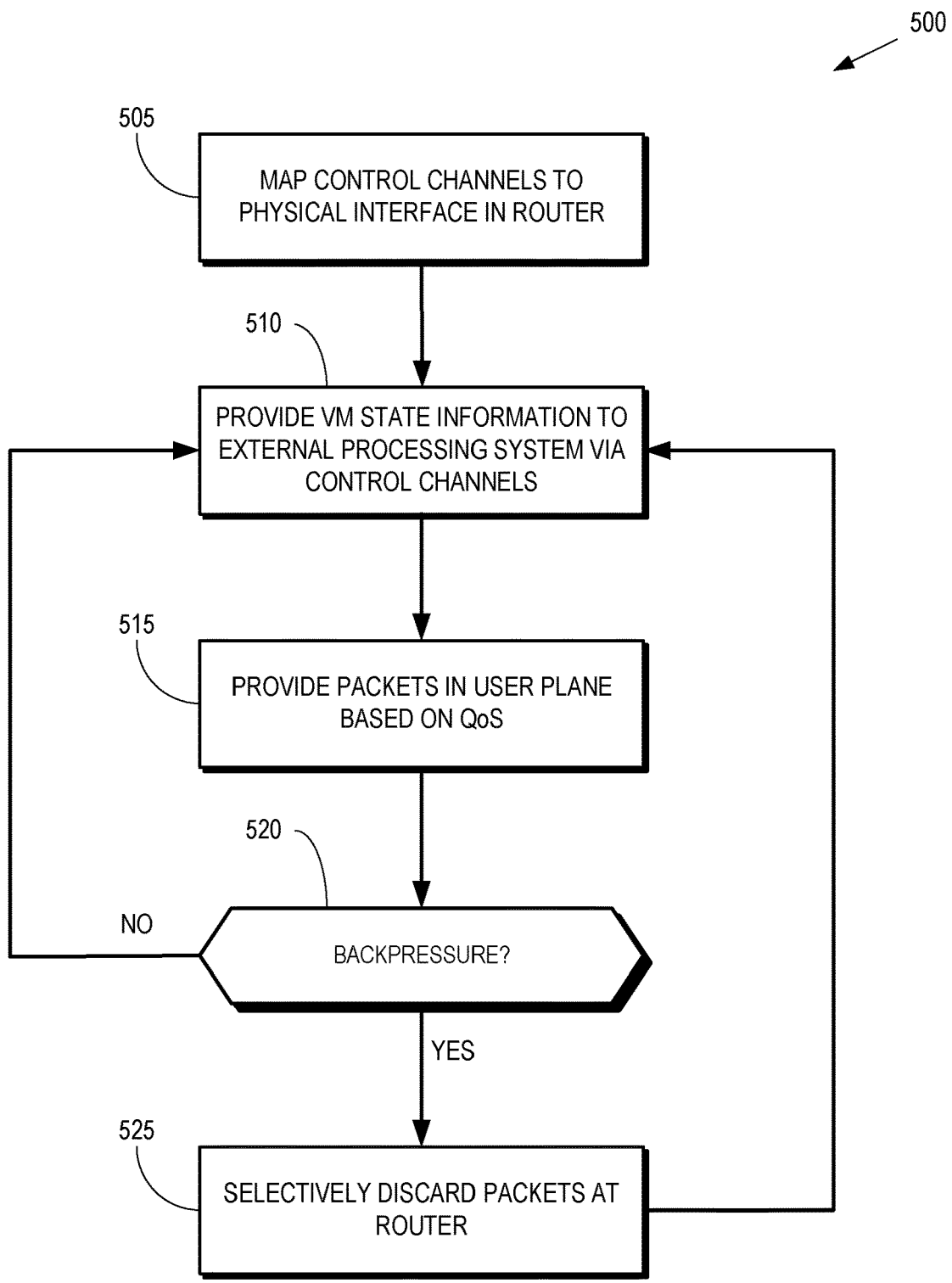
FIG. 5 is a flow diagram of a method of controlling packets provided to an external processing system based on backpressure feedback received at a router according to some embodiments.

FIG. 5 is a flow diagram of a method 500 of controlling packets provided to an external processing system based on backpressure feedback received at a router according to some embodiments. The method 500 is implemented in some embodiments of the router 120 shown in FIG. 1, the router 205 shown in FIG. 2, and the router 305 shown in FIG. 3. The external processing system is connected to the router via an interconnection port and the router has provided information for configuring an operating system and a hypervisor on the external processing system. The router has also provided commands to configure the external processing system to implement a virtual machine for performing general-purpose operations on behalf of the router.

At block 505, the router maps control channels for the virtual machine to a physical interface implemented in the router. The mapped control channels support an emulated local interface between the router and the external processing system, which makes the external processing system behave towards a controller in the router as if it was implemented locally in the router. The functionality supported by the virtual machines implemented by the external processing system are therefore handled as local functions, thereby making the remote virtual machines behave as local processing functions.

At block 510, the controller provides state information for the virtual machine to the external processing system via the mapped control channels. The state information is used to configure and control operation of the virtual machine. In some embodiments, the state information includes a subscriber identifier, a subscriber policy, a service policy for traffic sent to the VM, and the like. The controller, as well as the virtual machine, can modify the state information as needed.

At block 515, packets are provided to the virtual machine in the external processing system. Control plane packets are provided by a controller (such as the CPM 230 shown in FIG. 2) and user packets are provided by an I/O module (such as the I/O modules 231-234 shown in FIG. 2) via user plane interfaces (such as the ports 250, 255 shown in FIG. 2) based on a QoS for the packets. In some embodiments, the packets are held in one or more queues (such as a high-priority queue for control plane packets and a low priority queue four user plane packets) at the router prior to being released for provision to the external processing system.

At decision block 520, the I/O module determines whether backpressure has been received from the external processing system. If not, or if feedback indicating that the processing load on the virtual machine is below a threshold is received, the method 500 flows back to block 510. If backpressure has been received from the external processing system, the method 500 flows to block 525. Backpressure affects an ethernet layer in an MDA (such as the MDA 240 shown in FIG. 2) and causes the transmission to be paused. The pause in the transmission can result in queueing in the I/O modules, which is implemented QoS according to a predetermined QoS configuration by the CPM of the I/O modules.

At block 525, an MDA in the I/O module is paused, resulting in queueing of the egress packets that the I/O module. Queuing of the egress packets leads to selective discard of packets. In some embodiments, the selective discard is performed by discarding packets based on a queue priority scheduling (e.g., relative to the other queues), dropping packets based on packet marking such as DSCP/FC, or a combination of the two. For example, user plane packets associated with a corresponding low priority queue can be discarded.

Figure 6:
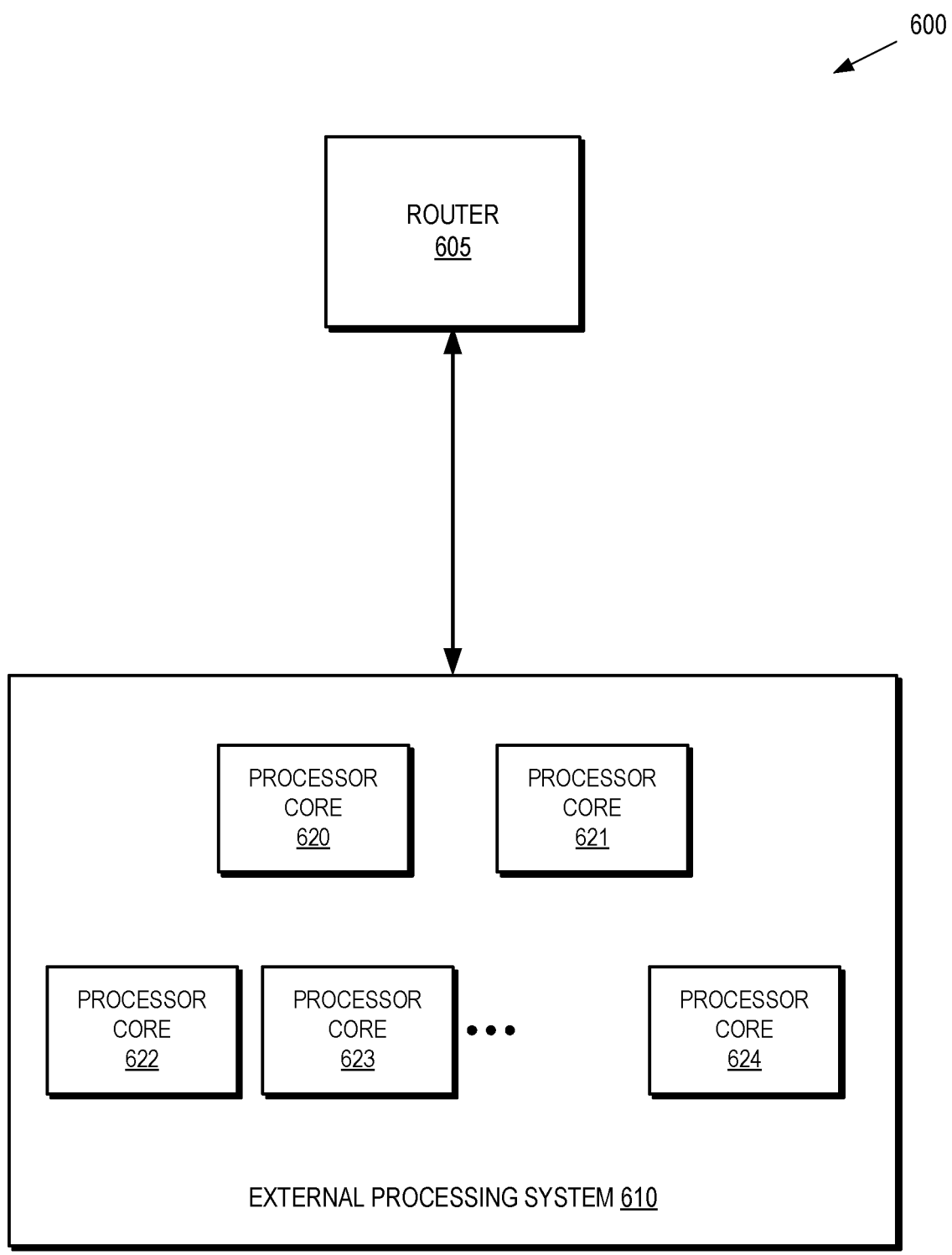
FIG. 6 is a block diagram of a communication system that includes a router and an external processing system that implements multiple processor cores according to some embodiments.

FIG. 6 is a block diagram of a communication system 600 that includes a router 605 and an external processing system 610 that implements multiple processor cores according to some embodiments. The communication system 600 is used to implement some embodiments of the communication system 100 shown in FIG. 1, the communication system 200 shown in FIG. 2, and the communication system 300 shown in FIG. 3. In the illustrated embodiment, the external processing system 610 includes a set of processor cores 620, 621, 622, 623, 624 (collectively referred to herein as "the processor cores 620-624") that execute instructions concurrently or in parallel. The processor cores 620-624 are used to implement some embodiments of the processor 215 shown in FIG. 2.

As discussed herein, the router 605 performs most (or all) routing operations for packets received by the router 605. The resources of the external processing system 610 are used to perform general-purpose operations on the packets, such as encoding/decoding, network address translation, deep packet inspection, and the like. The processor cores 620-623 are allocated to receiving packets from the router 605, performing the general-purpose operations on the packet, and transmitting packets to the router 605. The processor core 620 is allocated to perform I/O operations related to the packet arrival from a network interface card (NIC) in the router 605 and transmission of packets back to the NIC. Although a single processor core 620 is allocated to I/O operations in the illustrated embodiment, some embodiments of the external processing system 610 allocate more than one core to I/O operations. The processor core 621 is allocated to a scheduler that performs operations including reordering packets after processing. Although a single processor core 621 is allocated to scheduling in the illustrated embodiment, some embodiments of the external processing system 610 allocate more than one core to scheduling. The remaining processor cores 622-624 are allocated to perform the general-purpose operations on the packets.

In operation, the processor core 620 receives a packet from the router 605. In some cases, the processor core 620 also receives instructions indicating the general-purpose operation to be performed on the packet. The processor core 620 forwards the packet to one of the processor cores 622-624 to perform the general-purpose operation. Once the operation on the packet is complete, the selected one of the processor cores 622-624 sends the packet back to the processor core 621, which performs operations such as reordering out-of-order packets and scheduling the packets for transmission to the router 605 based on a rate. The processor core 621 provides the process packet to the processor core 620 for forwarding back to the router 605.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
 a) hardware-only circuit implementations (such as implementations and only analog and/or digital circuitry) and
 b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
 c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
a port configured to exchange signals with a router; and
at least one processor configured to:
implement a virtual machine having state information associated therewith;
receive packets from the router via the port, perform operations on the packets using the virtual machine, and send the packets back toward the router via the port; and
implement a user plane layer that determines a processing load on the virtual machine based on monitoring of at least one of the virtual machine or the state information, generates feedback representative of the processing load on the virtual machine, and provides the feedback to the router via the port.

2. The apparatus of claim 1, wherein the user plane layer is configured to provide the feedback by transmitting an ethernet pause frame via the port.

3. The apparatus of claim 1, wherein the user plane layer is configured to generate the feedback and provide the feedback in response to the processing load on the virtual machine exceeding at least one threshold.

4. The apparatus of claim 1, wherein the at least one processor is configured to:
instantiate the virtual machine using an operating system and a hypervisor in response to receiving a command from the router that indicates a type of the virtual machine and resources to be allocated to the virtual machine.

5. The apparatus of claim 4, wherein the at least one processor is configured to:
receive, from the router, control information for the virtual machine.

6. The apparatus of claim 5, wherein the control information comprises commands to access or control state associated with the virtual machine, support configuration of the virtual machine, or perform a health check of the virtual machine.

7. The apparatus of claim 1, wherein the operations on the packets include at least one of encoding, decoding, network address translation, or deep packet inspection.

8. The apparatus of claim 1, wherein the state information includes ingress queue depth information.

9. The apparatus of claim 1, wherein the at least one processor comprises a plurality of processor cores, and wherein at least one of the plurality of processor cores is allocated to input/output (I/O) operations associated with the signals exchanged with the router, at least one of the plurality of processor cores is allocated to scheduling operations for the packets received from the router, and at least one of the plurality of processor cores is allocated to performing the operations on the packets received from the router.

10. An apparatus, comprising:
a port allocated to an external processing system for communication of packets between the apparatus and the external processing system;
a set of queues configured to support queuing of packets, including user plane packets and control plane packets, intended for transmission toward the external processing system for processing by a virtual machine of the external processing system; and
a controller configured to:
support processing of packets by providing the packets toward the external processing system via the port and receiving the packets from the external processing system via the port;
receive, from the external processing system via the port, feedback indicating a processing load on the virtual machine of the external processing system; and
perform, based on the feedback, flow control for transmission of packets from the set of queues toward the external processing system.

11. The apparatus of claim 10, wherein the controller is configured to provide a command to the external processing system to instantiate the virtual machine of the external processing system.

12. The apparatus of claim 11, wherein the command comprises information indicating a type of the virtual machine and resources to be allocated to the virtual machine.

13. The apparatus of claim 10, wherein the flow control for transmission of packets from the set of queues toward the external processing system via the port includes determining whether to perform selective discarding of packets from the set of queues.

14. The apparatus of claim 13, wherein the flow control for transmission of packets from the set of queues toward the external processing system via the port includes selective discarding user plane packets.

15. The apparatus of claim 10, wherein the controller is configured to generate control information for the virtual machine and provide the control information to the external processing system.

16. The apparatus of claim 15, wherein the control information comprises commands to access or control state associated with the virtual machine, support configuration of the virtual machine, or perform a health check of the virtual machine.

17. The apparatus of claim 10, wherein, to perform flow control, packets are held in the set of queues in response to the feedback indicating that the processing load on the virtual machine of the external processing system has exceeded at least one threshold.

18. The apparatus of claim 10, wherein the set of queues includes a first queue configured to support queueing of the user plane packets and a second queue configured to support queuing of the data plane packets, wherein, to perform flow control, one or more of the user plane packets is dropped from the first queue without dropping the control plane packets from the second queue.

19. The apparatus of claim 10, wherein the apparatus includes an input/output (I/O) module, wherein the PO module includes the port and the set of queues.

20. A method comprising:
exchanging, at an external processing system, signals between the external processing system and a router via a port implemented in the external processing system;
implementing, at the external processing system, a virtual machine having state information associated therewith;
supporting, at the external processing system, processing of packets including receiving the packets from the router, performing operations on the packets using the virtual machine, and sending the packets back toward the router; and
implementing, at the external processing system, a user plane layer that determines a processing load on the virtual machine based on monitoring of at least one of the virtual machine or the state information, generates feedback representative of the processing load on the virtual machine, and provides the feedback to the router via the port.

21. A method comprising:
allocating a port of a router to an external processing system for communication of packets between the router and the external processing system;
supporting, based on a set of queues, queuing of packets, including user plane packets and control plane packets, intended for transmission toward the external processing system for processing by a virtual machine of the external processing system;
supporting processing of packets by providing the packets from the router to the external processing system via the port and receiving the packets from the external processing system via the port;
receiving, at the router from the external processing system via the port, feedback indicating a processing load on the virtual machine of the external processing system; and
performing, at the router based on the feedback, flow control for transmission of packets from the set of queues of the router toward the external processing system.

22. An apparatus comprising:
at least one processor; and
at least one memory storing instructions that, when executed by the at least one processor, cause the apparatus at least to perform:
  exchanging, at an external processing system, signals between the external processing system and a router via a port implemented in the external processing system;
  implementing, at the external processing system, a virtual machine having state information associated therewith;
  supporting, at the external processing system, processing of packets including receiving the packets from the router, performing operations on the packets using the virtual machine, and sending the packets back toward the router; and
  implementing, at the external processing system, a user plane layer that determines a processing load on the virtual machine based on monitoring of at least one of the virtual machine or the state information, generates feedback representative of the processing load on the virtual machine, and provides the feedback to the router via the port.

23. An apparatus comprising:
at least one processor; and
at least one memory storing instructions that, when executed by the at least one processor, cause the apparatus at least to perform:
  allocating a port to an external processing system for communication of packets between the apparatus and the external processing system;
  supporting, based on a set of queues, queuing of packets, including user plane packets and control plane packets, intended for transmission toward the external processing system for processing by a virtual machine of the external processing system;
  supporting processing of packets by providing the packets to the external processing system via the port and receiving the packets from the external processing system via the port;
  receiving, from the external processing system via the port, feedback indicating a processing load on the virtual machine of the external processing system; and
  performing, based on the feedback, flow control for transmission of packets from the set of queues toward the external processing system.

\* \* \* \* \*